United States Patent [19]

Gould

[11] Patent Number: 4,994,294

[45] Date of Patent: Feb. 19, 1991

[54] TEMPERATURE CONTROLLED FOOD PROCESSING APPARATUS AND METHOD

[76] Inventor: Bruce Gould, 1516 Sunny Crest Dr., Fullerton, Calif. 92635

[21] Appl. No.: 410,993

[22] Filed: Sep. 22, 1989

[51] Int. Cl.⁵ ............................ A23P 1/00; A22C 5/00
[52] U.S. Cl. ...................................... 426/519; 99/348; 165/88; 366/227; 426/520; 426/524
[58] Field of Search ............... 426/519, 510, 511, 520, 426/524; 165/88; 99/348, 470, 535; 366/227, 233

[56] References Cited

U.S. PATENT DOCUMENTS 4,086,369  4/1978  Mutoh et al. ....................... 426/519

Primary Examiner—George Yeung
Attorney, Agent, or Firm—Lyon & Lyon

[57] ABSTRACT

An apparatus and a method for processing food products including a rotatable container mounted on a frame structure. There are spiral fins disposed in the interior of the container for imparting movement to the food products at least in part along an axis of rotation of the container when the container is rotated about the axis of rotation. A temperature-controlling fluid is introduced into contact with at least the spiral fins to effect heat transfer between the fin surface area and the food products without direct contact between the food products and the temperature-controlling fluid, thereby controlling the temperature of the food processing operation.

7 Claims, 2 Drawing Sheets

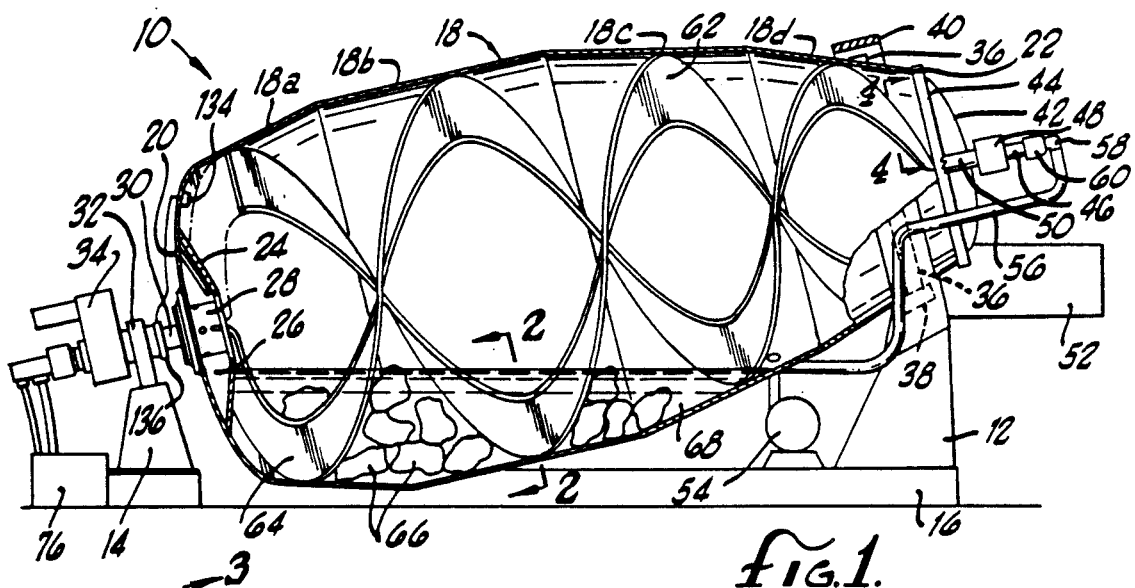

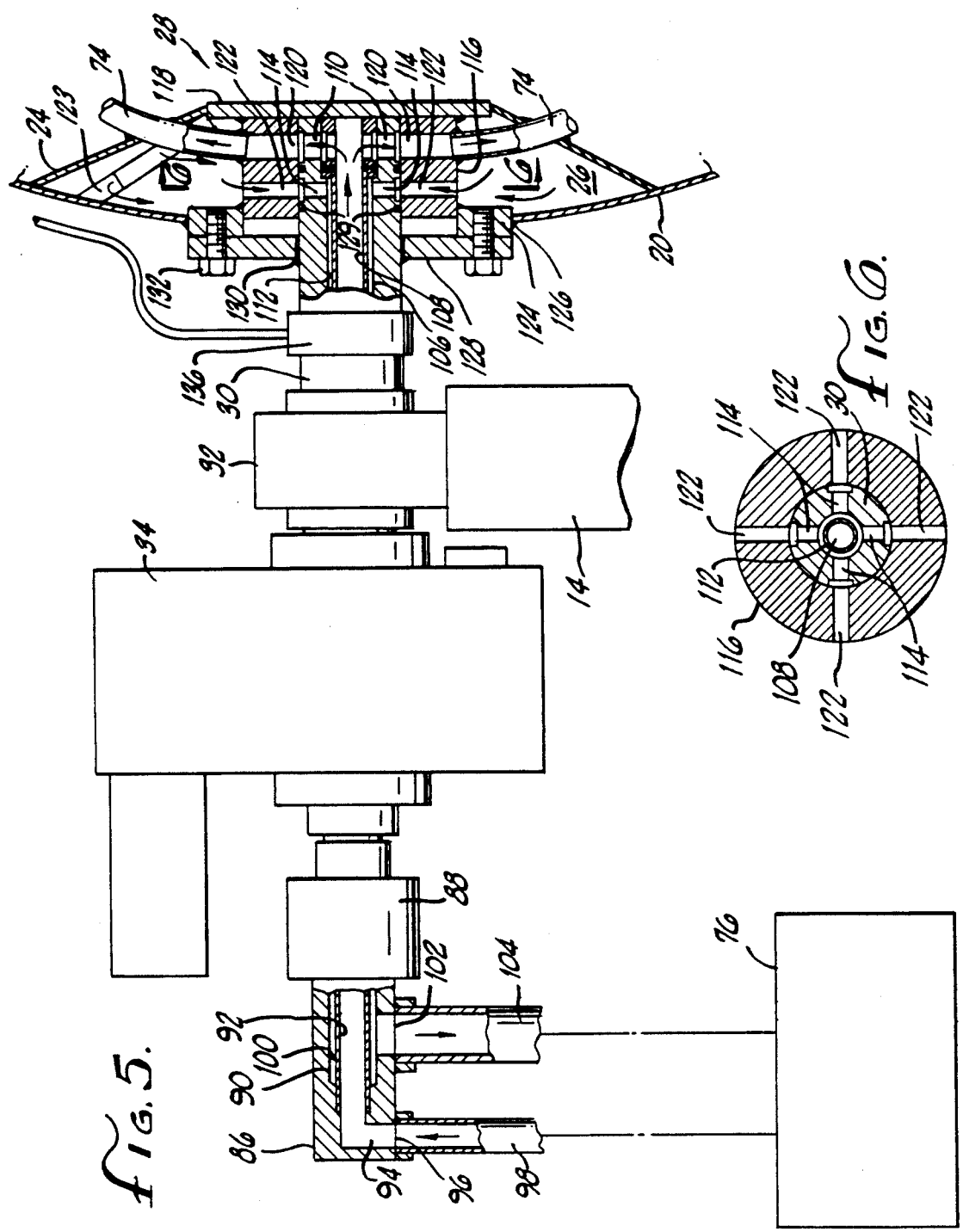

TEMPERATURE CONTROLLED FOOD PROCESSING APPARATUS AND METHOD

TECHNICAL FIELD

The present invention relates in general to an apparatus and method for processing food pieces. More specifically, the present invention comprises a temperature control system which can be employed with drum-type food processing apparatus.

BACKGROUND ART

The processing of food and food products frequently involves massaging and tumbling operations. These operations are particularly effective with meats such as cured hams, ham products, bacon bellies, corn beef briskets, beef round, roasts, turkey breasts and other poultry products. When applied to meat products which have been injected with or otherwise subjected to curing brine, tumbling and massaging accelerates the curing process while facilitating the distribution of the curing ingredient throughout the meat. The salt-soluble "binding" protein myosin is also extracted during tumbling in brine. Extraction of myosin from a meat product produces a sticky meat surface which increases the moisture absorption and retention characteristics of the meat and enhances product coherency.

Typically, tumbling is carried out by allowing meat products to fall from the upper part, e.g., of a rotating processing drum, or striking the meat products with paddles or baffles, thereby exerting "impact energy" influences on the muscle tissue of the meat. Massaging is a less physically vigorous activity involving the rubbing of meat surfaces against one another or against a smooth surface of a rotating drum to produce "frictional energy". Firm meat, e.g., beef, mutton and turkey, is usually tumbled whereas pork, chicken and other pale, soft meats are massaged.

Various apparatus for tumbling and massaging of meat and other food products have heretofore been devised. These prior art apparatus often employ rotating drums into which the meat products to be processed are inserted. U.S. Pat. No. 4,657,771 assigned to the assignee of the present invention discloses one such rotating drum processing apparatus. The axis of rotation for the drums may be inclined to varying degrees, with paddle or vane structures supplied when tumbling operations are to be carried out and smoother interior drum surfaces employed when more gentle massaging is called for. The curing fluid, e.g., brine, can be added to the drum, the drum sealed and mechanical tumbling or massaging initiated under atmospheric pressure conditions or, alternately, in a vacuum environment.

Temperature control over the food processing operation is another environmental factor of significance. For example, it is known that subjecting meat to lowered temperatures in the region between 32° F. and 34° F. results in a greater release of myosin. Meat and poultry products which are massaged at lower temperatures therefore exhibit improved internal binding of water molecules. The quality of the meat obtained following subsequent cooking operations is higher, leading to less post-cook purge. Reduced processing temperatures also retard bacterial growth in the meat, improving quality control yields and extending the shelf life of the processed product.

Conversely, elevating temperatures during massaging and tumbling operations with some types of meat can assist in dehydrating the meat in preparation for cooking or can actually function to cook the meat products.

Despite the desirability of exerting temperature control over food tumbling and massaging operations, prior art food processing apparatus which perform tumbling and massaging do not have adequate temperature control capabilities. Some work in the area of evaporative cooling of processed foodstuffs is believed to have been done in the past. Evaporative cooling, however, removes significant amounts of water from the foodstuffs undergoing processing, an undesirable consequence for many meat products which impacts deleteriously on further meat processing and cooking steps. Other approaches to temperature control, specifically cooling of the foodstuffs using carbon dioxide gas inside the processing drum or placement of the entire drum inside a cold room, have been attempted with equally unsatisfactory outcomes. In short, there is no prior art system which can rapidly and efficiently chill both the curing fluid and the foodstuff inside a food processing drum to a precisely controlled temperature.

It is therefore an object of the present invention to provide a temperature control system for food processing apparatus.

It is another object of the present invention to provide a control system which can be used to precisely adjust the temperature inside a food processing apparatus of the rotating drum type.

It is yet another object of the present invention to provide a system which circulates a temperature controlling fluid around the interior of a rotating drum food processor in order to adjust the interior temperature of the drum.

It is a further object of the present invention to provide a system which can distribute either a cooling fluid or a heating fluid about the interior of a rotating drum food processing apparatus, whereby the temperature of both the curing fluid and the food products inside the drum can be rapidly and efficiently raised or lowered to a desired point.

BRIEF DESCRIPTION OF THE DRAWINGS

The various objects, features and advantages of the present invention will be better understood by examining the descriptive Best Mode For Carrying Out The Invention found below, together with attached Drawings, wherein FIG. 1 is a side view of the food processing drum and related apparatus of the present invention in partial cross section;

FIG. 2 is a perspective view of a drum fin taken along line 2—2 of FIG. 1, illustrating the hollow fin configuration for circulating a temperature-controlling fluid in accordance with the present invention;

FIG. 3 is a sectional side view of the hollow drum fin taken along line 3—3 of FIG. 2, showing the baffle arrangement which creates a circuitous return flow path for the temperature-controlling fluid inside the fin;

FIG. 4 is a detailed sectional side view of the hollow drum fin taken along line 4—4 of FIG. 1, showing the connection between the temperture-controlling fluid supply conduit on the drum fin and the fluid return path;

FIG. 5 is a partial cross-sectional view at the drive end of the drum, showing the connection of the temperature-controlling fluid supply duct and return duct through a rotary union to the fluid storage and supply tank; and FIG. 6 is a cross-sectional view of the hollow drive shaft and diverter ring at the drive end of the drum, showing the shaft and diverter ring returns ports leading to the return duct in the shaft.

BEST MODE FOR CARRYING OUT THE INVENTION

The food pieces to be processed under temperature controlled conditions in accordance with the present invention are placed in a rotatable food processor of the type described in U.S. Pat. No. 4,657,771, the disclosure of which is incorporated herein by reference. Thus, the food processor apparatus includes a rotatable drum 10 supported on pedestals 12, 14 attached to frame 16. The longitudinal axis of drum 10 is inclined, preferably at an angle in the range between about 10° and about 15° relative to horizontal.

Drum 10 is constructed from a drum wall 18 of stainless steel with a glass bead blasted finish. Drum wall 18 consists of four segments 18a, 18b, 18c, and 18d. Segment 18a tapers outward from a closed end 20 of the drum to a central segment 18b of larger, relatively constant diameter. Segments 18c and 18d both gradually taper from segment 18b towards a smaller diameter at an open end 22 of the drum. The closed end 20 of the drum has attached to its inner surface and internal conical wall 24. An interior chamber 26 is formed between the conical wall and closed end 20. A cylindrical diverter ring or fitting 28, disclosed in greater detail below, is positioned in the center of conical wall 24. Diverter ring 28 receives a shaft 30 carried by a bearing assembly 32 on pedestal 14. A direct drive motor 34, which as disclosed in U.S. Pat. No. 4,657,771 may be of the hydrostatic type, turns shaft 30.

At the other end of drum 30, a track 36 circumferentially disposed about the outer surface of drum wall segment 18d rests on rollers 38 positioned at the top of pedestal 12, again all as disclosed in U.S. Pat. No. 4,657,771. A shield 40 covers track 36 in protective fashion. Upon energization of drive 34, shaft 30 turns in bearing assembly 32 while track 36 runs along rollers 38 and drum 10 is rotated to effect the desired food processing action.

The open end 22 of drum 10 is sealed with a door 42 formed from a dish-shaped plate. A circular reinforcing flange 44 around the periphery of door 42 abuts a tapered edge (not shown) on a circular reinforcing flange (not shown) welded to the open end 22 of the drum. A pipe 46 projecting from a port (not shown) in the center of the door contains a lead section 48 to which an arm 50 is joined. Arm 50 extends over the surface of door 42 and around flange 44 to pivot about a hinge on a mounting structure (not shown) at the side of drum wall segment 18d. Thus, door 42 may be opened using arm 50 to provide access to the interior of drum 10 or may be closed to seal off the drum. A delivery hopper 52 is located just below the door. If desired, a pneumatically-driven piston and cylinder means on the door arm mounting structure can be employed as an actuator for arm 50. The structural and functional details of door 42, including the arrangement of reinforcing flange 44 on the door, the reinforcing flange around the open end 22 of the drum and the construction of the door arm and door arm mounting structure, can all be seen to greater advantage in the aforementioned U.S. Pat. No. 4,657,771.

A vacuum pump 54 mounted on frame 16 below drum 10 is used to draw a vacuum inside the drum through flexible vacuum tubing 56. Flexible vacuum tubing 56 is connected at one end to the intake of pump 54 and at the other end through an elbow 58 to a rotating union 60 on the end of pipe 46. The presence of union 60 allows drum 10 to rotate relative to vacuum tubing 56. If desired, a valve (not shown) can be provided in pipe 46 to control the amount of suction through the pipe as the vacuum is drawn in the drum and to isolate the interior of the drum from the vacuum pump.

A pair of spiralling fins 62, 64 are fitted to the inner surface of drum wall 18 in the manner contemplated by U.S. Pat. No. 4,657,771, traversing the interior length of the drum from closed drum end 20 across drum wall segments 18a–18d to open drum end 22. When drum 10 is to be operated, individual pieces of food product 66, e.g., meat chunks, are loaded into the drum along with a suitable amount of curing agent 68 such as brine. The rotation of drum 10 then causes fins 62, 64 to move in a manner which effects the desired food processing action. The fins, which are oriented 180° out of phase relative to one another, are constructed with a lead angle relative to drum wall segments 18a–18d such that rotation of the drum in a first direction urges the pieces of food product 66 within the drum towards closed drum end 20 while drum rotation in the opposite direction causes the food products to move toward open drum end 22. When door 42 at drum end 22 is opened, rotation of the drum in the direction which moves food product toward the open drum end will effect discharge of the food product through the open drum end and into delivery hopper 52, where the food product can be fed to a suitable removal means.

A central feature of the present invention, discussed above, is the provision of a means for controlling the temperature in the interior of drum 10 during food processing. To this end, fins 62 and 64 employ a double-wall construction with a hollow interior suitable for carrying a temperature-controlling fluid. Any temperature differential between the fluid and the interior of the drum will result in heat transfer across the fins, allowing the temperature of the fluid to control the temperature of the food processing operation.

The double-wall construction of fin 62 can be seen to better advantage in FIG. 2, which is a cross-sectional perspective view of the fin taken along line 2—2 of FIG. 1. Fin 62 is formed from two plates 70, 72 welded to the drum wall 18 in spaced-apart parallel configuration. A tubular member 74 is attached to the top of both plates 70, 72, creating a chamber between the two plates. Tubular member 74 acts as a supply conduit for carrying the temperature-controlling fluid from a reservoir 76 at the drive end of drum 10 (see FIG. 1) to the open end 22 of the drum, where the temperature-controlling fluid is returned through the chamber between plates 70 and 72 back to reservoir 76.

In order to maximize the heat exchange properties of fin 62 (and fin 64), a series of baffles 78 spot welded as at 79 to plates 70, 72 are provided. Baffles 78 break up the flow of temperature-controlling fluid through the fins, creating a circuitous return flow path which distributes the temperature-controlling fluid more evenly across the inner surface area of plates 70, 72 to permit more uniform heat transfer across the outer surfaces of the plates.

FIG. 3 is a side view of fin 62 taken along line 3—3 of FIG. 2, showing the arrangement of baffles 78 in greater detail. Tubular member 74 is positioned at the top of fin 62 and drum wall 18 is positioned at the bottom of the fin. The circuitous nature of the return flow path for the temperature-controlling fluid, indicated at 80, can be readily appreciated. It is understood that fin 64 is constructed in like fashion.

Turning to FIG. 4, the juncture between the temperature-controlling fluid supply conduit formed by tubular member 74 and the return flow path 80 created by the baffles 78 attached to plates 70, 72 is depicted. Supply conduit 74 tapers toward drum wall 18 at the open end 22 of drum 10. This tapered configuration is depicted in the cut-away portion of open end 22 shown in FIG. 1. Returning to FIG. 4, at a point shortly before conduit 74 intersects drum wall 18, several openings 82 are provided between the interior of the conduit and the hollow space between plates 70, 72. Baffles are removed from this small section of the fins to create a chamber 84 which collects the temperature-controlling fluid from the supply conduit 74. The temperature-controlling fluid thereafter enters the circuitous return flow path 80 for return back through the fin to reservoir 76.

FIG. 5 illustrates the arrangement of the temperature control system components responsible for supplying temperature-controlling fluid from the drive end of drum 10 to the fins 62, 64. The drive end includes shaft 30 which supports the drum, bearing 32 on pedestal 14 which supports the shaft, and drive motor 34 which turns the shaft. The distal end of shaft 30 is connected to a manifold 86 through a "Duff-Norton" rotary union 88. The rotary union allows shaft 3 to rotate in alignment with the manifold while the manifold remains stationary. The central portion of manifold 86 contains a cavity 90 through which a tubular supply duct 92 passes. Supply duct 92 is inserted into an L shaped passageway 94 at the back of the manifold. Passageway 94 terminates in an inlet port 96 which is joined to an inlet pipe 98 from reservoir 76. At the same time, the inner surface of cavity 90 and the outer surface of supply duct 92 establish an annular passageway 100 which serves as a return duct. Return duct 100 communicates through an outlet port 102 with an outlet pipe 104 returning to reservoir 76.

As previously noted, manifold 86 mates with shaft 30 through rotary union 88. Shaft 30 is constructed in hollow fashion, with a central cavity 106. A supply duct 108 is positioned in the center of the shaft, and connects to one or more outflow ports 110 formed at the terminus of the shaft. The annular passage 112 established between the outer wall of supply duct 108 and the hollow interior of the shaft likewise intersects a series of return ports 114.

Rotary union 88 serves to align shaft supply duct 108 with manifold supply duct 92. Similarly, annular passageway 112 in shaft 30 is aligned with annular passageway 100 of manifold 86 through the rotary union. In this way, fluid communication between supply duct 92 of the manifold and supply duct 108 of the shaft, and between the return duct formed by annular passageway 100 in the manifold and the return duct formed by annular passageway 112 in the shaft, is maintained.

Shaft 30 is secured to drum end 20 of drum 10 using the diverter ring 28. The diverter ring is comprised of a cylindrical assembly 116 welded onto plate 118 in the center of the conical wall 24 at drum end 20. Cylindrical assembly 116 contains a pair of outflow ports 120 which connect to the open ends of the temperature-controlling fluid supply conduits 74 atop fins 62, 64. Cylindrical assembly 116 also contains a series of return ports 122 which communicate with the interior chamber 26 bounded by internal conical wall 24. Return ports 122 receive temperature-controlling fluid which enters chamber 26 from the interior of vanes 62, 64 through an opening 123 in the conical wall. A bolt ring 124 at the end of assembly 116 attaches to the drum end 20, e.g., by welding as indicated at 126. Bolt ring 124 is used to fasten shaft 30 to the drum end, as will be described next.

A bolt plate 128 is welded to shaft 30, as indicated at 130. A series of bolt holes are tapped in both the bolt ring 124 on cylindrical assembly 116 and the bolt plate 128. Shaft 30 is then inserted into the cylindrical assembly and bolts 132 are used to fasten the bolt plate to the bolt ring, thus joining the shaft to the drum end. With shaft 30 so inserted, diverter ring outflow ports 120 are aligned with outlet flow ports 110 at the end of supply duct loB. Diverter ring return ports 122 likewise align with return ports 114 at the end of annular passageway 112. O-ring seals 129 may be provided around the shaft to prevent fluid leakage between the shaft supply and return ducts.

FIG. 6, taken along line 6—6 of FIG. 5, is a cross-section of the cylindrical assembly 116 of diverter ring 28, showing the alignment of diverter ring return ports 122 with shaft return ports 114. Four such pairs of return ports 122, 114 are provided in the preferred embodiment of the present invention, although it is understood that either a greater or lesser number of return ports may suffice. Shaft supply duct 108 can also be seen to good advantage in FIG. 6.

Returning to FIG. 5, the flow path of temperature-controlling fluid to and from drum 10 will now be summarized. The temperature-controlling fluid is stored in reservoir 76. Where elevated temperatures inside drum 10 are desired, the fluid may consist of heated water, steam or any like fluid capable of conveying and/or radiating heat. If the particular foodstuff processing operation calls for lowering temperatures inside the drum, an appropriate coolant material may be kept in the reservoir. In either event, drum temperatures are adjusted to the desired level by removing the temperature-controlling fluid from reservoir 76 with a pump (not shown) or other positive fluid pressure generating device through inlet pipe 98, manifold passageway 94 and supply duct 92 in manifold 86. The temperature-controlling fluid then enters supply duct 108 of shaft 30, travelling along the shaft supply duct until reaching the end plate 118 of diverter ring 28. At plate 118, the temperature-controlling fluid is redirected by shaft outflow ports 110 and diverter ring outflow ports 120 to supply conduits 74 at the top of fins 62, 64. The flow of temperature-controlling fluid continues through the supply conduits 74 to the terminus of the fins (see FIG. 4) where it exits from openings 82 in supply conduits 74 to chamber 84.

Temperature-cooling fluid gathered in the chamber 84 at the terminus of each fin 62, 64 flows back toward drum end 20 through the circuitous return path 80 created by baffles 78 inside the walls 70, 72 of each fin, effecting heat exchange with the interior of drum 10 along the way. The fins eventually reach conical wall 24, where opening 123 in the conical wall leading to the interior of each fin provides for fluid outflow from return path 80 into interior chamber 26. Leaving chamber 26, the temperature-controlling fluid enters return ports 12 in diverter ring 26 and return ports 114 in shaft 30, passes through shaft return duct 112 and return duct 100 of manifold 86 and flows back into reservoir 76 through return port 102 and return pipe 104. Once in reservoir 76, the temperature-controlling fluid can be reheated or recooled, as the case may be, by any suitable means (not shown) known to those skilled in the art in preparation for recirculation through fins 62, 64 in drum 10.

If desired, a temperature sensor 134 can be attached to drum 10 and connected to a collar 136 surrounding shaft 30. Temperature sensor 134 transmits temperature readings back to the heating or cooling apparatus in the reservoir for the purpose of adjusting the fluid temperature, and hence the temperature inside the drum.

The present invention has been set forth in the form of one preferred embodiment. It is nevertheless intended that modifications to the cooling system for food processing apparatus disclosed herein, such as providing a jacketed drum wall 18 through which temperature-controlling fluid can be circulated or a heat transfer plate on the exterior or interior surface of the drum wall for controlling temperature, may be made by those skilled in the art without departing from the scope and spirit of the present invention. Moreover, such modifications are considered to be within the purview of the appended claims.

I claim:
1. An apparatus for processing food products, said apparatus comprising:
   a container structure having an interior into which food products to be processed can be inserted;
   a frame structure which supports said container structure for rotation about an axis;
   drive means for rotating said container structure in said frame structure about said axis;
   structural means disposed in said interior of said container structure for imparting movement to the food products, said movement having at least one component parallel to said axis when said drive means rotates said container structure, said structural means exhibiting a predetermined surface area; and
   temperature control means for adjusting the temperature in said interior of said container structure to control the temperature of the food processing operation, said temperature control means including a fluid supply means for bringing a temperature-controlling fluid into heat-transfer contact with at least a portion of said surface area of said structural means such that heat transfer occurs between the food products and said temperature-controlling fluid without direct contact between said temperature-controlling fluid and the food products.

2. A method for processing a multiplicity of integral food pieces comprising:
   feeding the food pieces into a rotatable container structure having an interior with a fin structure exhibiting a predetermined surface area mounted therein to effect movement of food pieces at least in part along an axis of rotation of the container structure when the container structure is rotated about the axis of rotation;
   rotating the container structure about the axis of rotation such that said rotation causes the fin structure to draw the food pieces into contact with each other and to move the food pieces in substantially continuous fashion throughout the interior of the container structure; and
   introducing a temperature-controlling fluid into contact with at least the fin structure to effect heat transfer between the fin structure surface area and the food pieces without direct contact between the food pieces and said temperature-controlling fluid, thereby controlling the temperature of the food processing operation.

3. An apparatus as set forth in claim 1 wherein said structural means disposed in said interior of said container structure includes a fin structure mounted to said interior of said container structure and said fluid supply means includes at least one hollow baffled chamber within said fin structure through which said temperature-controlling fluid can be circulated to keep said fin structure at a constant temperature, thereby effecting heat transfer between the surface of said fin structure and the food products in order to the control the temperature of the food processing operation.

4. An apparatus as set forth in claim 3 wherein said fluid supply means includes:
   a reservoir means for establishing and maintaining the temperature of said temperature-controlling fluid before said temperature-controlling fluid is circulated and for acting as a receptacle to receive said temperature-controlling fluid after it has been circulated so that the temperature of said temperature-controlling fluid can be maintained in preparation for recirculation;
   means for connecting said reservoir means to said hollow baffled chamber within said fin structure such that said reservoir means remains stationary as said container structure rotates.

5. An apparatus as set forth in claim 4 which utilizes a suitable temperature sensing means for transmitting temperature readings back to said reservoir to facilitate maintenance of the temperature of said temperature-controlling fluid.

6. An apparatus as set forth in claim 1 wherein said container structure comprises a drum having a jacketed drum wall through which said fluid supply means circulates said temperature-controlling fluid, thereby keeping said drum at a constant temperature to effect heat transfer between said drum and the food products in order to control the temperature of the food processing operation.

7. An apparatus for processing materials, said apparatus comprising:
   a container structure having an interior into which said materials to be processed can be inserted;
   a frame structure which supports said container structure for rotation about an axis;
   drive means for rotating said container structure in said frame structure about said axis;
   structural means disposed in said interior of said container structure for imparting movement to the materials, said movement having at least one component parallel to said axis when said drive means rotates said container structure, said structural means exhibiting a predetermined surface area; and
   temperature control means for adjusting the temperature in said interior of said container structure to control the temperature of the material processing operation, said temperature control means including a fluid supply means for bringing a temperature-controlling fluid into heat-transfer contact with at least a portion of said surface area of said structural means such that heat transfer occurs between the materials and said temperature-controlling fluid without direct contact between said temperature-controlling fluid and the materials.

* * * * *